US008887899B2

(12) United States Patent
Kawagoe et al.

(10) Patent No.: US 8,887,899 B2
(45) Date of Patent: Nov. 18, 2014

(54) LIQUID JETTING APPARATUS

(71) Applicant: Brother Kogyo Kabushiki Kaisha, Nagoya (JP)

(72) Inventors: Masako Kawagoe, Nagoya (JP); Kohei Terada, Kiyosu (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 11 days.

(21) Appl. No.: 13/628,042

(22) Filed: Sep. 27, 2012

(65) Prior Publication Data

US 2013/0161412 A1 Jun. 27, 2013

(30) Foreign Application Priority Data

Dec. 27, 2011 (JP) ................................ 2011-284779

(51) Int. Cl.
*B65G 23/44* (2006.01)
*B65G 23/00* (2006.01)
*B41J 29/13* (2006.01)

(52) U.S. Cl.
USPC ............................ 198/813; 198/832; 347/108

(58) Field of Classification Search
CPC ........ B41J 2/1752; B41J 19/005; B41J 19/36; B41J 25/001
See application file for complete search history.

(56) References Cited

U.S. PATENT DOCUMENTS

| | | | | |
|---|---|---|---|---|
| 4,487,518 | A | 12/1984 | Enrini | |
| 4,746,237 | A | 5/1988 | Takeda | |
| 4,808,020 | A | 2/1989 | Kudo | |
| 6,164,755 | A | 12/2000 | Yamamoto | |
| 6,260,945 | B1 | 7/2001 | Niikura | |
| 6,690,494 | B1 * | 2/2004 | Yamada | 358/497 |
| 7,878,322 | B2 * | 2/2011 | Kawamata | 198/813 |
| 2007/0151830 | A1 | 7/2007 | Kawamata | |
| 2011/0141211 | A1 | 6/2011 | Narita | |

FOREIGN PATENT DOCUMENTS

| | | | |
|---|---|---|---|
| CN | 87 1 00952 | A | 9/1988 |
| JP | H04-115671 | U | 10/1992 |
| JP | 2011-121258 | A | 6/2011 |

OTHER PUBLICATIONS

Yamamoto et al., JP04115671 translation.*
Office Action issued in CN 201210549925.2, mailed Jun. 24, 2014.

* cited by examiner

*Primary Examiner* — Stephen Meier
*Assistant Examiner* — Renee I Wilson
(74) *Attorney, Agent, or Firm* — Merchant & Gould PC

(57) ABSTRACT

There is provided a liquid jetting apparatus which includes a casing, a liquid jetting head, a carriage, a first to third pulleys, a motor connected to one of the first to third pulleys, an endless belt put around the first to third pulleys, a tension pulley which applies a tension to the endless belt, a regulating mechanism which regulates a movement of the tension pulley within a plane orthogonal to a shaft of the tension pulley such that the tension pulley becomes movable in a scanning direction, and a bias applying mechanism which applies bias to the tension pulley, in a direction of moving closer to the third pulley in the scanning direction.

14 Claims, 9 Drawing Sheets

LIQUID JETTING APPARATUS

CROSS REFERENCE TO RELATED APPLICATION

The present application claims priority from Japanese Patent Application No. 2011-284779 filed on Dec. 27, 2011, the disclosure of which is incorporated herein by reference in its entirety.

BACKGROUND OF THE INVENTION

1. Field of the Invention

The present invention relates to a liquid jetting apparatus configured to jet a liquid from nozzles.

2. Description of the Related Art

In Japanese Utility Model Application Publication No. H4-115671, a carriage driving mechanism which is used in a printer etc. is described. The carriage driving mechanism described in Japanese Utility Model Application Publication No. H4-115671 includes two pulleys (a first pulley and a second pulley) which are arranged on two sides of the carriage in a moving direction of the carriage (a scanning direction), a pulley (a third pulley) which is arranged at a position not aligned with the two pulleys (the first pulley and the second pulley) in a direction orthogonal to the scanning direction, an endless belt which is put around to make a contact from outside with the three pulleys, and a pulley (a tension pulley) which applies a tension to the belt by bending the belt by making a contact with an outer surface of the belt at a portion between the third pulley and the first pulley.

The tension pulley is fixed to a lever which is supported with a hinge so that the lever is pivotable around the hinge. The hinge is provided at almost the same position as of the first pulley in the scanning direction, and the lever is pulled by a spring. Accordingly, when the lever is pivoted, the tension pulley moves up to a position at which a force of the spring and the tension of the belt are balanced, and the tension in the belt is adjusted to a magnitude corresponding to a bias of the spring.

SUMMARY OF THE INVENTION

Here, in the carriage driving mechanism described in Japanese Utility Model Application Publication No. H4-115671, a space is formed between a plane which is parallel to the scanning direction and passes a shaft (an axis) of the third pulley and a portion of the belt between the tension pulley and the second pulley. Moreover, from a point of view of small sizing of an apparatus, it is preferable to use the space formed effectively by arranging components of the apparatus in this space.

However, in the abovementioned carriage driving mechanism, the lever is pivotably supported with the hinge provided at almost the same position as of one of the driven pulley in the moving direction of the carriage. Therefore, when the tension pulley is moved by pivoting the lever, the tension pulley moves in both the scanning direction and the direction orthogonal to the scanning direction. Therefore, an angle of the portion of the belt between the tension pulley and the second pulley with respect to the scanning direction fluctuates according to the position of the tension pulley. Therefore, when some components of the apparatus are arranged in the space formed, there is a possibility that the components arranged at the space and the portion of the belt between the tension pulley and the second pulley interfere.

An object of the present invention is to provide a liquid jetting apparatus in which it is possible to adjust the tension of the belt which is for driving the carriage, and also to use the space around the belt effectively.

According to an aspect of the present teaching, there is provided a liquid jetting apparatus configured to jet a liquid, including:

a casing;

a liquid jetting head configured to jet the liquid;

a carriage on which the liquid jetting head is mounted, and which is configured to be movable in a scanning direction;

a first pulley and a second pulley which are arranged in the casing, to be mutually isolated in the scanning direction such that an external common tangent of the first pulley and the second pulley is parallel to the scanning direction;

a third pulley which is arranged in the casing so that an external common tangent with the first pulley and the third pulley intersects with the scanning direction;

a motor which is coupled to one of the first pulley, the second pulley, and the third pulley;

an endless belt which is put around the first pulley, the second pulley, and the third pulley, to make a contact with the first pulley, the second pulley, and the third pulley, and on which the carriage is installed at a portion positioned on the external common tangent of the first pulley and the second pulley;

a tension pulley which makes a contact with a contact portion of the endless belt, which is positioned on a surface on an outer side of a portion of the endless belt between the second pulley and the third pulley, and which applies a tension to the endless belt by bending the portion of the endless belt between the second pulley and the third pulley;

a regulating mechanism which is configured to regulate a movement of the tension pulley within a plane orthogonal to a shaft of the tension pulley such that the tension pulley is movable in the scanning direction; and a bias applying mechanism which is configured to apply bias to the tension pulley, in a direction of moving closer to the third pulley in the scanning direction.

According to the present teaching, the tension pulley makes a contact with the contact portion of the endless belt, which is positioned on a plane on the outer side of the portion of the endless belt between the second pulley and the third pulley, and bends the portion of the endless belt between the second pulley and the third pulley, and also the tension pulley is movable in the scanning direction. Therefore, it is possible to adjust a magnitude of the tension in the belt by moving the tension pulley in the scanning direction.

Furthermore, at this time, when the endless belt is bent such that when a portion of the endless belt between the contact portion and the second pulley becomes parallel to the scanning direction, or when an angle of inclination (of the endless belt) with respect to the scanning direction becomes small, an angle of the portion of the endless belt with respect to the scanning direction almost does not change when the tension in the endless belt is adjusted by moving the tension pulley in the scanning direction. Consequently, when the tension in the endless belt is adjusted by moving the tension pulley, a size of a space between the portion of the endless belt and a plane parallel to the scanning direction, passed the shaft of the third pulley does not change substantially.

DETAILED DESCRIPTION OF THE PREFERRED EMBODIMENTS

An exemplary embodiment of the present teaching will be described below with reference to the accompanying diagrams. In the following description, a right side and a left side of a scanning direction are defined based on FIG. 1, and a direction perpendicular to a paper surface of FIG. 1 is defined to be a vertical direction (up-down direction).

Figure 1:
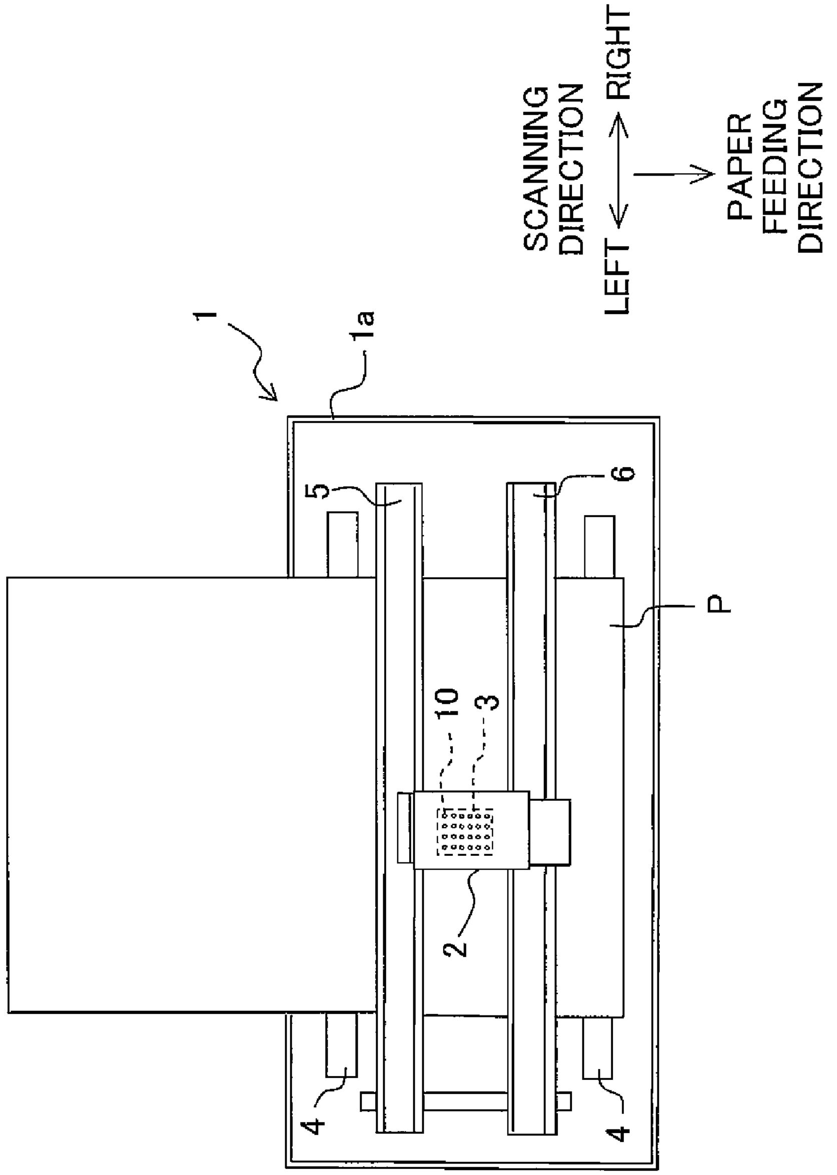
FIG. 1 is a schematic structural diagram of a printer according to an embodiment of the present invention.
Figure 2:
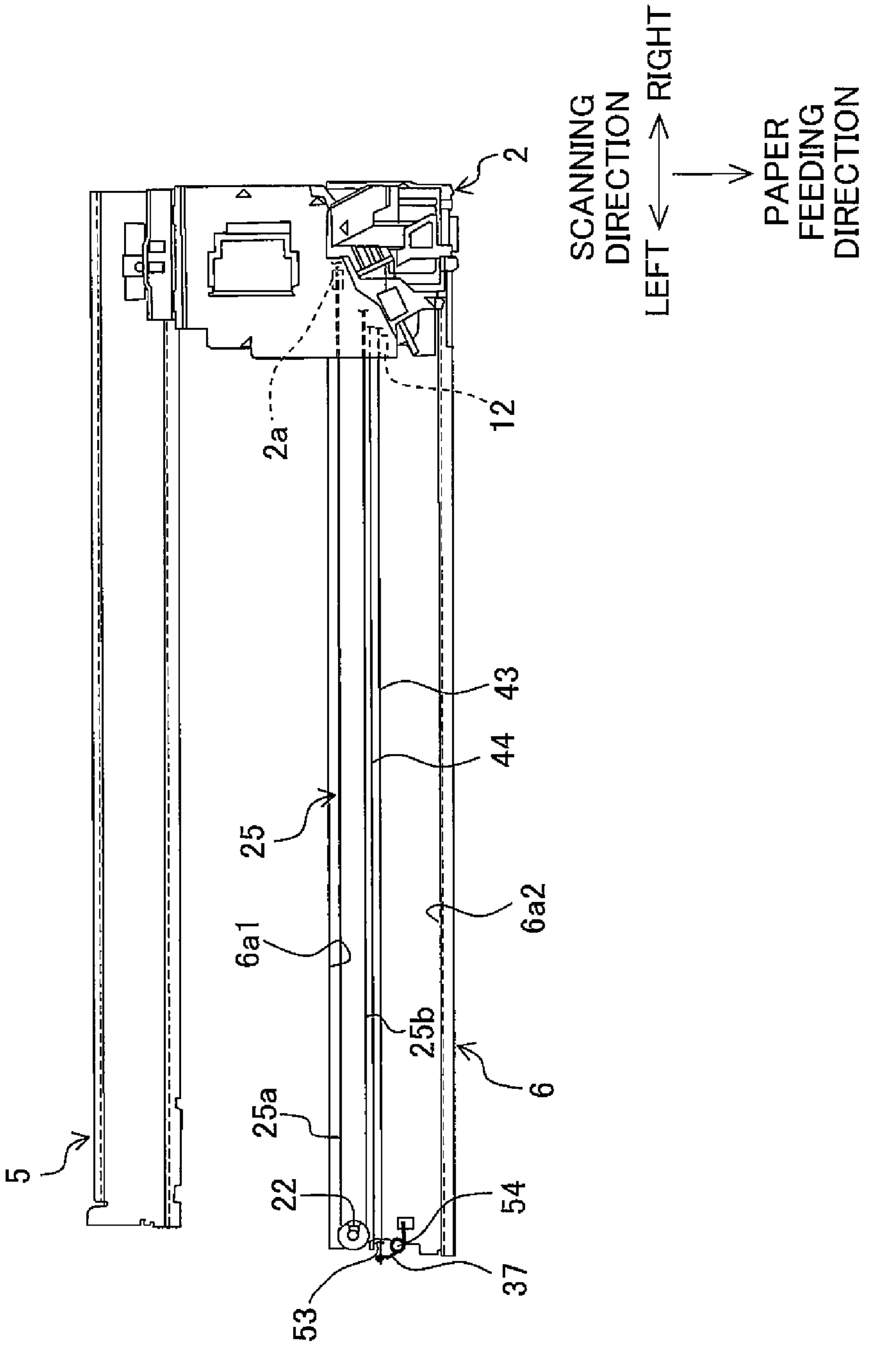
FIG. 2 is a plan view showing a structure of a carriage and guide rails in FIG. 1.
Figure 3:
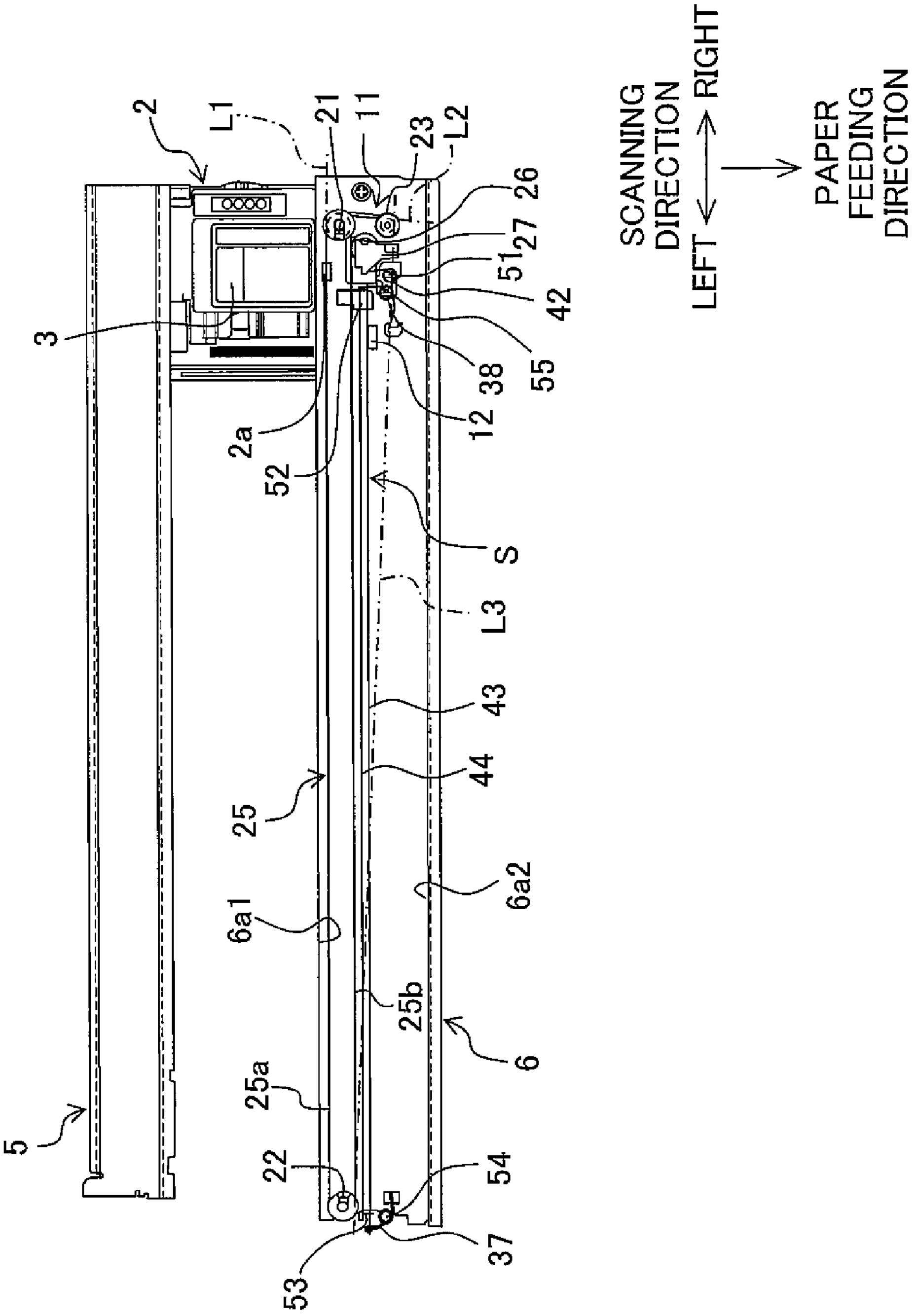
FIG. 3 is a diagram in which, a portion of the carriage at an upper side of the guide rails is omitted.
Figure 4:
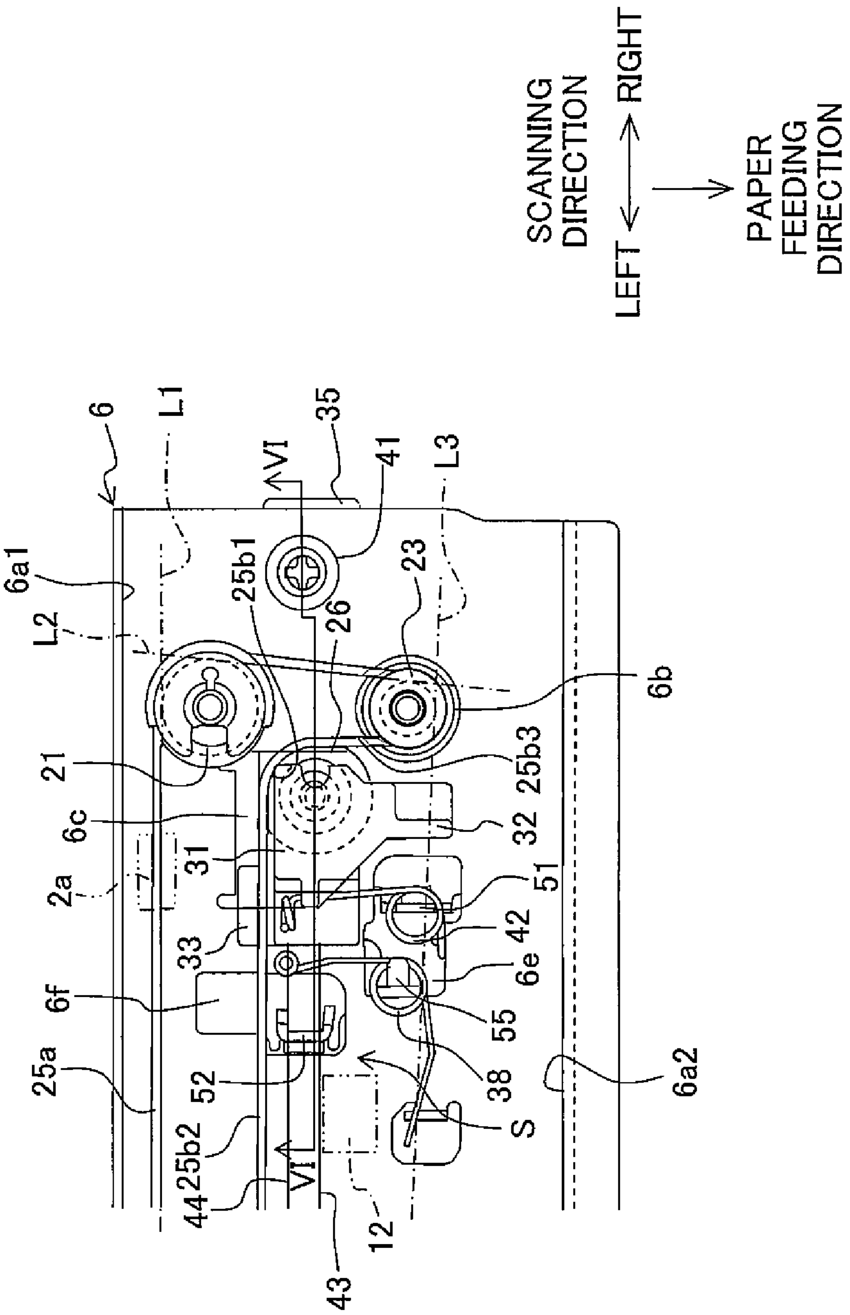
FIG. 4 is a partially enlarged view of FIG. 3.
Figure 5B:
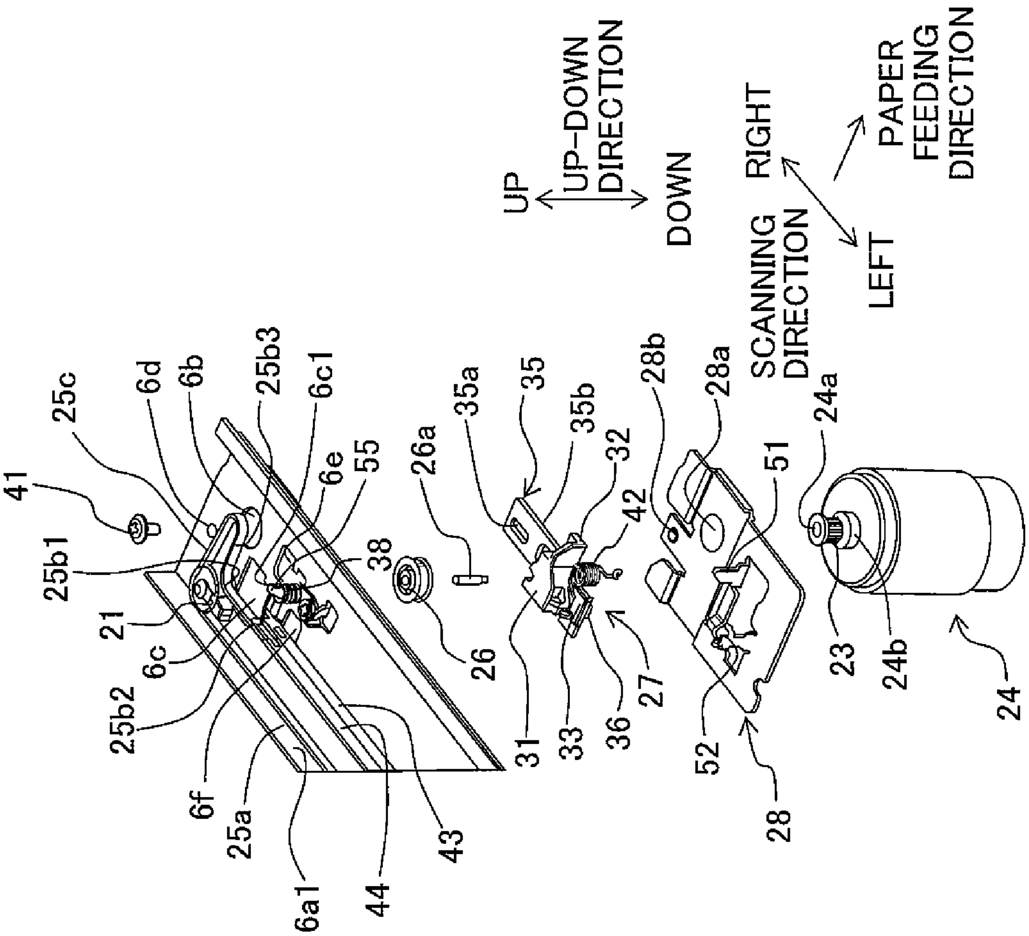
FIG. 5B is an exploded perspective view of FIG. 5A.
Figure 5A:
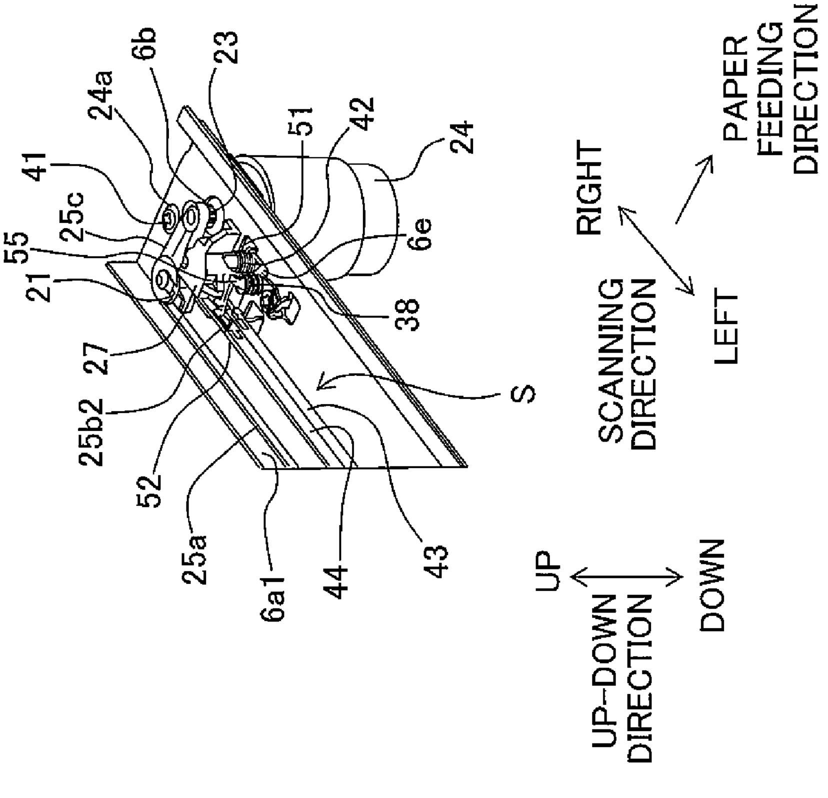
FIG. 5A is a perspective view of a portion shown in FIG. 4.

As shown in FIG. 1, a printer 1 according to the embodiment includes a carriage 2, an ink-jet head 3, a paper transporting roller 4 and the like. The carriage 2 is arranged to be movable in the scanning direction along two guide rails 5 and 6 provided to a printer body 1*a*, and reciprocates in the scanning direction when a moving mechanism 11 which will be described later, is driven. In the embodiment, the printer body 1*a* and the guide rails 5 and 6 corresponds to a casing according to the present teaching. The ink-jet head 3 is mounted on a portion, of the carriage 2, positioned between the guide rail 5 and the guide rail 6, and is configured to jet an ink from a plurality of nozzles 10 formed in a lower surface of the ink-jet head 3. The paper transporting roller 4 transports a recording paper P in a paper feeding direction (paper transporting direction) which is orthogonal to the scanning direction.

In the printer 1, printing is carried out on the recording paper P which is transported in the paper feeding direction by the paper transporting roller 4, by jetting the ink from the ink-jet head 3 reciprocating in the scanning direction together with the carriage 2. Moreover, the recording paper P having printing carried out thereon, is discharged by a paper transporting roller.

Next, a structure of the carriage 2, the guide rails 5 and 6, and the moving mechanism 11 which moves the carriage 2 will be described by referring to diagrams from FIG. 2 to FIG. 8. However, in FIG. 8, a part of a portion of a pulley holder 27 which will be described later, to be indicated by dotted line is omitted in the diagram.

Plates, which are made of a metallic material and each of which has a rectangular shape extending in the scanning direction as a longitudinal direction in a plan view, are bended at both end portions in the paper feeding direction to form the guide rails 5 and 6, respectively. To explain more elaborately, two ends in the paper feeding direction of the guide rail 5 are bent upward, and furthermore, a portion at an outer side of the bent portion is bent outward in the paper feeding direction. Moreover, the guide rail 5 supports an upstream end portion of the carriage 2 in the paper feeding direction, at a substantially central portion of the carriage 2 in the paper feeding direction.

Whereas, an upstream end portion of the guide rail 6 in the paper feeding direction is bent upward, and also, a downstream end portion of guide rail 6 in the paper feeding direction is bent upward. Furthermore, a portion of the guide rail 6 at an outer side of the bent portion is bent outward of the paper feeding direction. Moreover, the guide rail 6 supports, from a lower side, a downstream end portion of the carriage 2 in the paper feeding direction. A downstream surface of the upstream end portion of the guide rail 6 in the paper feeding direction which is extended in the vertical direction by being bent, defines a sliding surface 6*a*1 which is extended in the scanning direction, and an upperstream surface of the downstream end portion of the guide rail 6 in the paper feeding direction which is extended in the vertical direction by being bent, defines a sliding surface 6*a*2 which is extended in the scanning direction.

The carriage 2 is arranged so that the carriage 2 makes a contact with the sliding surfaces 6*a*1 and 6*a*2 from the paper feeding direction, and is movable in the scanning direction by sliding on the sliding surfaces 6*a*1 and 6*a*2.

The moving mechanism 11 includes three pulleys 21, 22, and 23 (hereinafter, 'pulleys 21 to 23'), a motor 24, a belt 25, a tension pulley 26, and the pulley holder 27.

The pulley 21 (a first pulley) is arranged at a right-end portion on an upper surface of the guide rail 6. The pulley 22 (a second pulley) is arranged at a left-end portion on the upper surface of the guide rail 6. In other words, the pulley 21 and the pulley 22 are arranged to be separated mutually in the scanning direction. Moreover, the pulley 21 and the pulley 22 are at the same position with respect to the paper feeding direction, and an external common tangent L1 of the pulley 21 and the pulley 22 is parallel to the scanning direction.

The pulley 23 (a third pulley) a pulley having a plurality of teeth along a circumferential direction thereof, and is arranged on the upper surface of the guide rail 6, at a position shifted to a downstream side in the paper feeding direction from the pulley 21. Accordingly, the pulley 23 is arranged at a position at which an external common tangent L2 with the pulley 21 intersects the scanning direction. The motor 24 is arranged at a lower side of the guide rail 6, and a shaft 24*a* of the motor 24 is directly coupled with the pulley 23. Here, the shaft 24*a* of the motor 24 which is arranged at a lower side of the guide rail 24 is drawn up to an upper side of the guide rail 6 through a through hole 6*b* formed in a portion of the guide rail 6, facing the pulley 23, and the shaft 24*a* is coupled with the pulley 23.

The belt 25 is an endless belt, and is put around the pulleys 21 to 23 to make a contact with a circumference of each of the pulley 21 to 23. A belt grip 2*a* which is provided to the carriage 2 is fixed to a portion 25*a* of the belt 25 put around the pulleys 21 to 23, which is positioned on the external common tangent L1 of the pulley 21 and the pulley 22. Accordingly, the carriage 2 is fixed to the belt 25.

Moreover, the belt 25 is a timing belt and a plurality of teeth which are not shown in the diagram, is formed on an inner peripheral surface of the belt 25. The teeth of the belt 25 are engaged with the teeth of the pulley 23. Accordingly, when the pulley 23 is rotated by driving the motor 24, the belt 25 rotates, and at this time, the pulleys 21 and 22 rotate together with the belt 25 due to a force of friction with the belt 25. As the belt 25 rotates, the portion 25*a* moves in the scanning direction, and accordingly, the carriage 2 which is fixed to the portion 25*a* moves in the scanning direction.

The tension pulley 26 is arranged on the upper surface of the guide rail 6, at an immediate left side of the pulleys 21 and 23 in the scanning direction, at a position between the pulley 21 and the pulley 23 in the paper feeding direction. The tension pulley 26 makes a contact with a contact portion **25*b*1 of the belt 25, which is positioned on a surface on an outer side of a portion 25*b* of the belt 25 between the pulley 22 and the pulley 23. Further, the tension pulley 26 bends the portion 25*b* of the belt 25. Accordingly, the contact portion 25*b*1 is positioned at an inner side of an external common tangent L3 of the pulley 21 and the pulley 23. Moreover, a portion 25*b*2, of the portion 25*b* of the belt 25 which is bent, between the contact portion 25*b*1 and the pulley 22 is substantially parallel to the scanning direction, and a portion 25*b*3, of the portion 25*b* of the belt 25 which is bent, between the contact portion 25*b*1 and the pulley 23** is substantially parallel to the paper feeding direction.

The pulley holder 27 is arranged so that the pulley holder 27 is passed through a substantially rectangular through hole **6*c* formed in the guide rail 6 and is spread across an upper side and a lower side of the guide rail 6. A pulley holding portion 31 is provided to a portion of the pulley holder 27, which is positioned at an upper side of the guide rail 6 (a portion indicated by an alternate long and two short dashes line in FIG. 7), and which faces the through hole 6*b*. A shaft 26*a* which supports the tension pulley 26 is fixed to the pulley holding portion 31, and accordingly, the tension pulley 26 is supported by the pulley holding portion 31**.

Moreover, an upper-side portion of the pulley holder 27, which is positioned at the upper side of the guide rail 6, is provided with an arm 32. The arm 32 is extended up to a position which does not face the through hole **6*b*, on a downstream side of the paper feeding direction of the pulley holding portion 31. Moreover, a first extended portion 33 which is extended up to a position which does not face the through hole 6*b* is provided to a left side of the pulley holding portion 31**.

Figure 7:
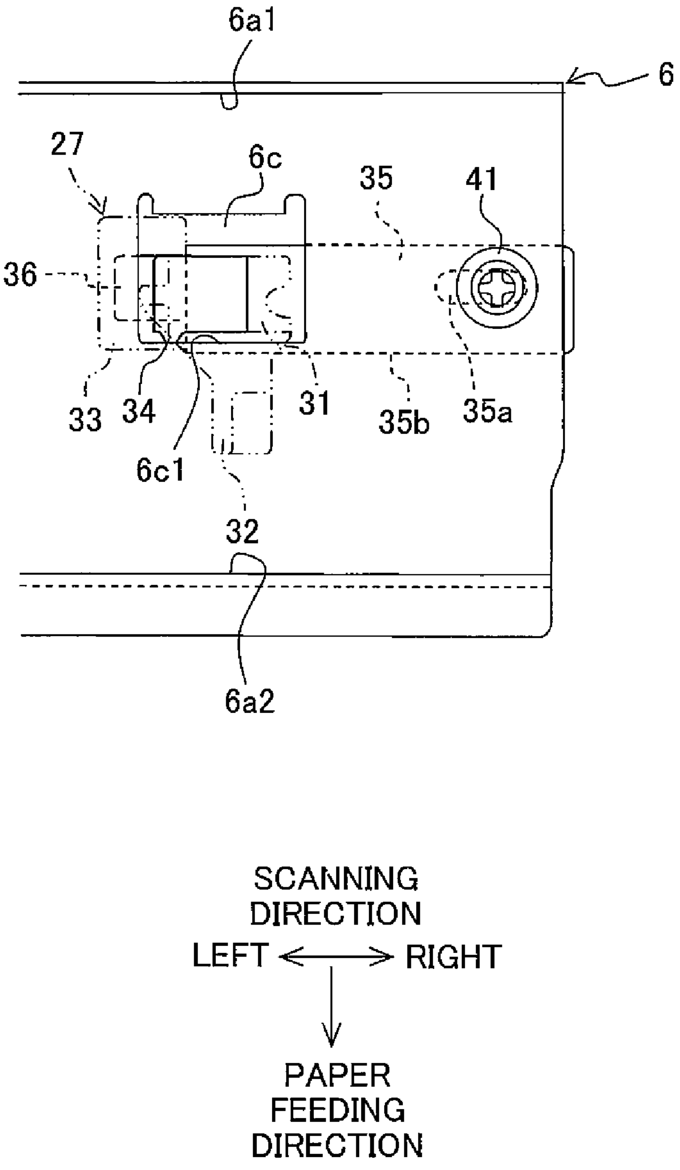
FIG. 7 is a diagram showing a positional relation of a pulley holder in a plan view, and a hole of a frame to which the pulley holder is fixed.

A protrusion (a projection) 34 which is protruded toward the downstream side of the paper feeding direction, is provided at an end of the downstream side of the paper feeding direction, of a portion of the pulley holder 27, which is positioned inside the through hole **6*c* (portion indicated by a thick line in FIG. 7). The protrusion 34 makes a contact with a wall surface 6*c*1 of the through hole 6*c*, on the downstream side of the paper feeding direction. The wall surface 6*c*1** is extended in the scanning direction.

Moreover, a portion of the pulley holder 27 which is positioned at a lower side of the guide rail 6 is extended continuously to be spreading across left-right of the through hole **6*c*, with respect to the scanning direction. Moreover, a second extended portion 35 of the pulley holder 27, which is positioned on a right side of the through hole 6*c* is extended up to slightly left side of a right end of the guide rail 6. A substantially elliptical shaped through hole 35*a* is formed in a right-end portion of the second extended portion 35 of the pulley holder 27. Whereas, a substantially circular shaped through hole 6*d* is formed in a portion of the guide rail 6, facing the through hole 35*a*. Moreover, a downstream side end (edge) surface 35*b* in the paper feeding direction, of the second extended portion 35, extending in the scanning direction makes a contact with an outer peripheral surface of a shaft supporting portion 24*b* supporting the shaft 24*a* of the motor 24**.

Moreover, a lower-side extended portion 36 which is positioned at a left-end portion of a portion of the pulley holder 27 positioned at a lower side of the guide rail 6 overlaps with the abovementioned first extended portion 33 in a plan view, and the guide rail 6 is sandwiched from an upper side and a lower side by the first extended portion 33 and the lower-side extended portion 36.

Regarding the pulley holder 27 having a structure as described above, the protrusion 34 of the pulley holder 27 makes a contact with the wall surface **6*c*1 of the through hole 6*c*, and the end surface 35*b* of the second extended portion 35 of the pulley holder 27 makes a contact with the shaft supporting portion 24*b* of the motor 24 as mentioned above. Accordingly, the pulley holder 27 is regulated to move to the downstream side of the paper feeding direction. Whereas, since a tension T of the belt 25 is exerted to the tension pulley 26 bending the belt 25 and the pulley holder 27 holding the tension pulley 26, in a direction toward the downstream side of the paper feeding direction and toward leftward direction, the protrusion 34 is pushed against the wall surface 6*c*1, and also, the end (edge) surface 35*b* is pushed against the outer peripheral surface of the shaft supporting portion 24*b***.

Consequently, the pulley holder 27 and the tension pulley 26 which is held by the pulley holder 27 are movable only in the scanning direction along the wall surface **6*c*1. In the embodiment, the shaft supporting portion 24*b* and the wall surface 6*c*1 which regulate the movement of the pulley holder 27** to the downstream side in the paper feeding direction correspond to a regulating mechanism according to the present teaching.

A plate 28 is provided at a lower side of the pulley holder 27, and the abovementioned motor 24 is arranged at further lower side of the plate 28. The plate 28 is a member in the form of a rectangular-shaped plate made of a metallic material, and a lower-side portion of the pulley holder 27, which is positioned at a lower side of the guide rail 6 is sandwiched between the guide rails 6 and is fixed to a lower surface (fixed surface) of the guide rail 6 by a bolt which is not shown in the diagram.

A substantially circular shaped through hole **28*a* is formed in a portion of the plate 28 overlapping with the pulley 23, and the shaft supporting portion 24*b* of the motor 24 is passed through the through hole 28*a*, and is drawn to an upper side of the plate 28**.

Moreover, a substantially circular shaped through hole **28*b* is formed in a portion of the plate 28, facing the through holes 35*a* and 6*d*. A bolt 41 is inserted through the through holes 6*d*, 35*a*, and 28*b*, and accordingly, the pulley holder 27 is fixed to the lower surface of the guide rail 6**.

Moreover, a film fitting portion 52 and a spring fitting portion 51 extended upward of the plate 28 are provided to the plate 28, at a left side of the pulley holder 27. To explain more elaborately, the spring fitting portion 51 and the film fitting portion 52 are provided to a portion positioned at a downstream side of the portion **25*b*2 of the belt 25 in the paper feeding direction, and at an upstream side of the shaft of the pulley 23 (in other words, between the portion 25*b*2 of the belt 25 and a plane that is parallel to the scanning direction and passes the axis of the pulley 23). Through holes 6*e* and 6*f* are formed in portions of the guide rail 6 which overlap with the spring fitting portion 51 and the film fitting portion 52 respectively, and the spring fitting portion 51 and the film fitting portion 52 are extended up to an upper side of the guide rail 6, upon passing through the through holes 6*e* and 6*f***.

A torsion spring 42 is fitted to the spring fitting portion 51. A lower-end portion of the torsion spring 42 is supported by the guide rail 6, and an upper-end portion of the torsion spring 42 makes a contact with a portion of the pulley holder 27 at the upper side of the guide rail 6 and at a left side and lower side of the tension pulley 26. Accordingly, the torsion spring 42 applies a bias (a biasing force) to the pulley holder 27 in a rightward direction, or in other words, in a direction of getting closer to the pulleys 21 and 23 in the scanning direction.

Here, the pulley holder 27, as mentioned above, is fixed to the guide rail 6 by the bolt 41, and this will be described below in further detail. At the time of manufacturing of the printer 1, the pulley holder 27 and the torsion spring 42 are assembled. At this time, the pulley holder 27 which is movable in the scanning direction assumes a state of being arranged at a position at which a force F22 acting on the pulley holder 27 due to the tension of the belt 25, in the scanning direction, and a force F21 acting on the pulley holder 27 due to the bias of the torsion spring 42 are balanced. Accordingly, the tension T of the belt 25 is adjusted to a magnitude corresponding to the bias of the torsion spring 42. Moreover, the pulley holder 27, in this state, is fixed to the lower surface of the guide rail 6 by the bolt 41. Consequently, the bias of the torsion spring 42 is fixed to the bias at the time of assembling.

Moreover, a film fitting portion 53 is provided to a left-end portion of the guide rail 6, at a portion overlapping with the film fitting portion 52 in the scanning direction. An encoder film 43 which is extended in the scanning direction is arranged between the two film fitting portions 52 and 53, and a right-end portion and a left-end portion of the encoder film 43 are fitted (attached) to the film fitting portions 52 and 53 respectively.

Moreover, a spring fitting portion 54 is provided to the left-end portion of the guide rail 6, and a torsion spring 37 is fitted to the spring fitting portion 54. A lower-end portion of the torsion spring 37 is supported by the guide rail 6, and an upper-end portion of the torsion spring 37 is fitted to the left-end portion of the encoder film 43, thereby pulling the encoder film 43 to the left side. Accordingly, the encoder film 43 is extended in the scanning direction without being slacked.

The encoder film 43 is a film having a plurality of slits which is not shown in the diagram, formed therein along the scanning direction. A position detection element 12 is provided to the carriage 2, at a portion facing a surface on the downstream side in the paper feeding direction of the encoder film 43. By detecting the slit of the encoder film 43 by the position detection element 12, it is possible to detect a position of the carriage 2. In the embodiment, the encoder film 43 together with the position detection element 12, correspond to an encoder according to the present teaching.

Moreover, a protective film or a protection film 44 which is extended in the scanning direction is arranged between the two film fitting portions 52 and 53, at a portion positioned between the encoder film 43 and the portion **25*b*2 of the belt 25 in the paper feeding direction. A right-end portion and a left-end portion of the protective film 44 are fixed to the film fitting portions 52 and 53** respectively.

A spring fitting portion 55 is provided to a portion on an immediate left side of the spring fitting portion 51, of the upper surface of the guide rail 6, and a torsion spring 38 is fitted to the spring fitting portion 55. A lower-end portion of the torsion spring 38 is supported by the guide rail 6, and an upper-end portion of the torsion spring 38 is fitted to the right-end portion of the protective film 44, thereby pulling the protective film 44 to right side. Accordingly, the protective film 44 is extended in the scanning direction without being slacked.

In the embodiment, since the protective film 44 is arranged between the encoder film 43 and the portion **25*b*2 of the belt 25 in such manner, at the time of moving the carriage 2, even in a case in which the portion 25*b*2 of the belt 25 is slacked temporarily toward the encoder film 43, the belt 25 makes not contact with the encoder film 43**.

As described above, in the printer 1 according to the embodiment, the tension pulley 26 makes a contact with the contact portion **25*b*1 which is positioned on the surface on the outer side of the portion 25*b* of the belt 25, between the pulley 22 and the pulley 23, and bends the portion of the belt 25 between the pulley 22 and the pulley 23, and also the pulley 23 is movable in the scanning direction. Therefore, by moving the tension pulley 26 in the scanning direction, it is possible to adjust the magnitude of the tension of the belt 25**.

Furthermore, at this time, the portion **25*b*2 of the belt 25, between the contact portion 25*b*1 and the pulley 22 is parallel to the scanning direction. Therefore, when the tension in the belt is adjusted by moving the tension pulley 26 in the scanning direction, an angle made by the portion 25*b*2 of the belt 25 with the scanning direction almost does not change. Consequently, when the tension in the belt is adjusted by moving the tension pulley 26, a size of a space S which is positioned at a downstream side in the paper feeding direction of the portion 25*b*2 of the belt 25, and at an upstream side in the paper feeding direction of the shaft of the pulley 23 (in other words, the space S is a space located between the portion 25*b*2 and a plane that is parallel to the scanning direction and passes the shaft of the pulley 23**), does not fluctuate or change substantially.

Consequently, even when the encoder film 43, the protective film 44, the film fitting portions 52 and 53, and the spring fitting portions 54 and 55 are arranged in the space S, when the belt 25 is adjusted by moving the pulley holder 27 in the scanning direction, the portion **25*b*2 of the belt 25 does not interfere with these portions. Moreover, it is possible to arrange the encoder film 43 etc. in the space S, thereby making it is possible to reduce an overall size of the printer 1**.

Moreover, in the embodiment, since the torsion spring 42 applies bias to the pulley holder 27 in the direction parallel to the direction in which the pulley holder 27 is movable, it is possible to reduce a bias of the torsion spring 42.

Figure 9:
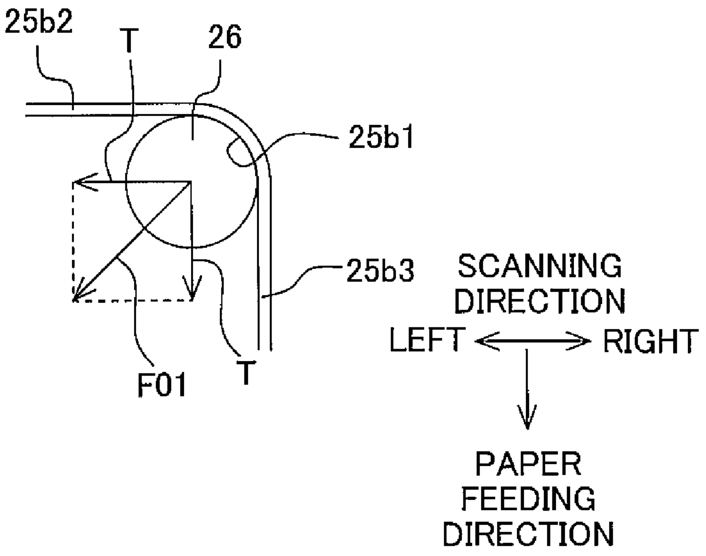
FIG. 9 is a diagram showing a force which acts on the tension pulley due to tension of a belt.

To explain concretely, when the tension in the belt 25 is T, the tension T acts on the tension pulley 26, in the scanning direction and the paper feeding direction as shown in FIG. 9. As a result, a force F01 which is a combined force thereof acts on the tension pulley 26 and the pulley holder 27 which holds the tension pulley 26.

Assuming that the torsion spring 42 is arranged so that the torsion spring 42 applies a bias to the pulley holder 27 in a direction inclined with respect to the scanning direction. At this time, for letting the tension of the belt 25 to be T, a bias of the torsion spring 42 having a component in the scanning direction of the torsion spring 42 of the same magnitude as the tension T, and a component in the paper feeding direction as well becomes necessary. In other words, the magnitude of the bias of the torsion spring 42 has to be larger than the tension T.

Whereas, in the embodiment, since the torsion spring 42 applies bias to the pulley holder 27 in a direction parallel to the scanning direction, the bias applied by the torsion spring 42 does not have a component in the paper feeding direction. Therefore, a magnitude of the bias of the torsion spring is same as a magnitude of the tension T. Accordingly, a small bias applied to the torsion spring 42 serves the purpose. The tension T in the paper feeding direction is to be balanced by a force by which the wall surface **6*c*1 of the through hole 6*c* pushes back the protrusion 34, and a force by which the shaft supporting portion 24*b* of the motor 24 pushes back the second extended portion 35 of the pulley holder 27**.

Moreover, since a small bias applied by the torsion spring 42 serves the purpose, it is possible to use the torsion spring 42 which has a small spring constant. Accordingly, it is possible to reduce unevenness in the bias applied by the torsion spring 42.

Moreover, in the embodiment, since the pulley holder 27 is fixed to the lower surface of the guide rail 6 at a position at the time of assembling, it is possible to fix a position of the tension pulley 26 to a position at the time of assembling the tension pulley 26 and the torsion spring 42. In this case, even when the tension T in the belt 25 is reduced, jumping of the belt 25 hardly occurs. Consequently, by reducing the tension T in the belt 25, it is possible to reduce a frictional resistance between the pulleys 21 to 23 and the rotating shafts thereof, or between the rotating shafts of the pulleys 21 to 23 and bearings thereof. Accordingly, it is possible to reduce a load exerted to the motor 24.

Moreover, in the embodiment, when positions of the pulleys 21 and 22 in the paper feeding direction are changed, the portion 25*a* of the belt 25, to which the belt grip 2*a* of the carriage 2 is fitted, is inclined with respect to the scanning direction. Therefore, it is not possible to change the positions of the pulleys 21 and 22 in the paper feeding direction. Whereas, regarding the pulley 23, even when a position of the pulley 23 in the paper feeding direction is changed, it has no effect on a direction of the portion 25*a* of the belt 25. Consequently, a degree of freedom of a layout for the pulley 23 is higher than a degree of freedom of a layout for the pulleys 21 and 22.

Consequently, as in the embodiment, since the pulley 23 with a higher degree of freedom of layout is a driving pulley to which the shaft 24*a* of the motor 24 is to be coupled with, a degree of freedom of a layout of a motor becomes higher than in a case in which one of the pulleys 21 and 22 is the driving pulley.

Figure 8:
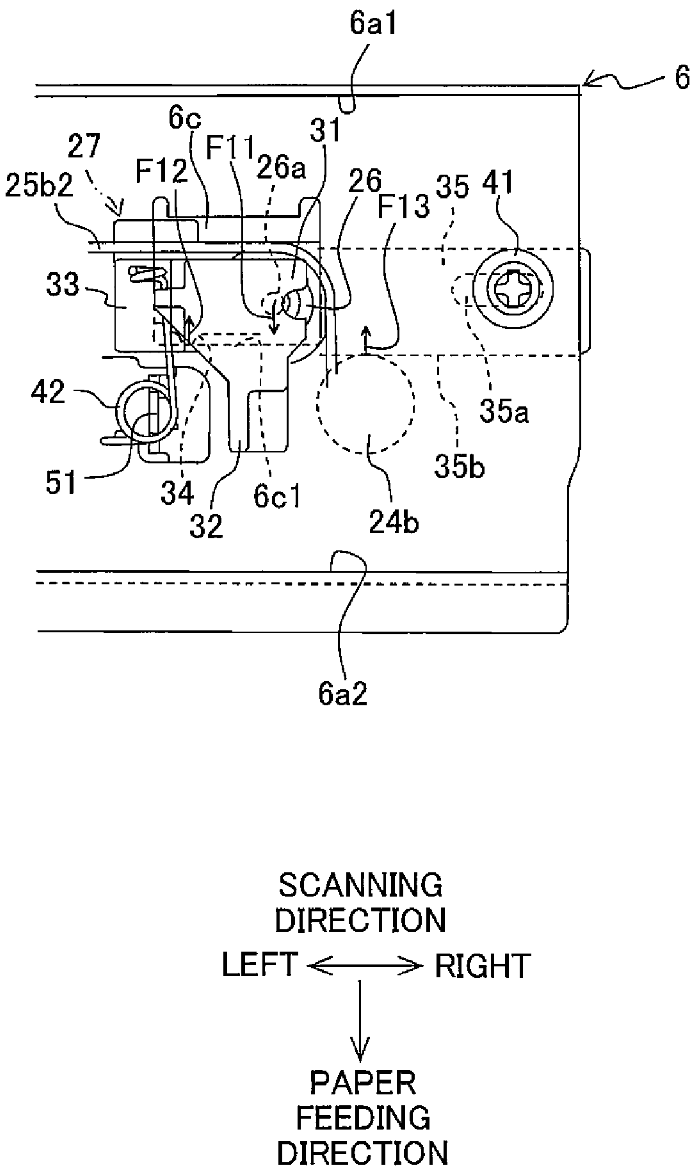
FIG. 8 is a diagram showing a force in a secondary (sub) scanning direction applied to the pulley holder.

Moreover, as shown in FIG. 8, in the embodiment, a force F11 (≅T) directed toward the downstream side in the paper feeding direction from the belt 25 acts on the contact portion 25*b*1 of the pulley holder 27 holding the tension pulley 26, and also forces F12 and F13 directed toward the upstream side in the paper feeding direction act on the protrusion 34 and a contact portion of the end surface 35*b* with the shaft supporting portion 24*b*, respectively.

At this time, the protrusion 34 is arranged on the left side (one side of the scanning direction) of the contact portion 25*b*1, and the shaft supporting portion 24*b* is arranged on the right side (the other side of the scanning direction) of the contact portion 25*b*1. Therefore, a moment generated in the pulley holder 27 due to the force F11 directed toward the downstream side in the paper feeding direction, and a moment generated in the pulley holder 27 due to the forces F12 and F13 directed toward the downstream side in the paper feeding direction are counterbalanced (cancelled) with each other. Accordingly, the pulley holder 27 is prevented from being inclined or tilted in a plane orthogonal to the vertical direction.

Figure 6:
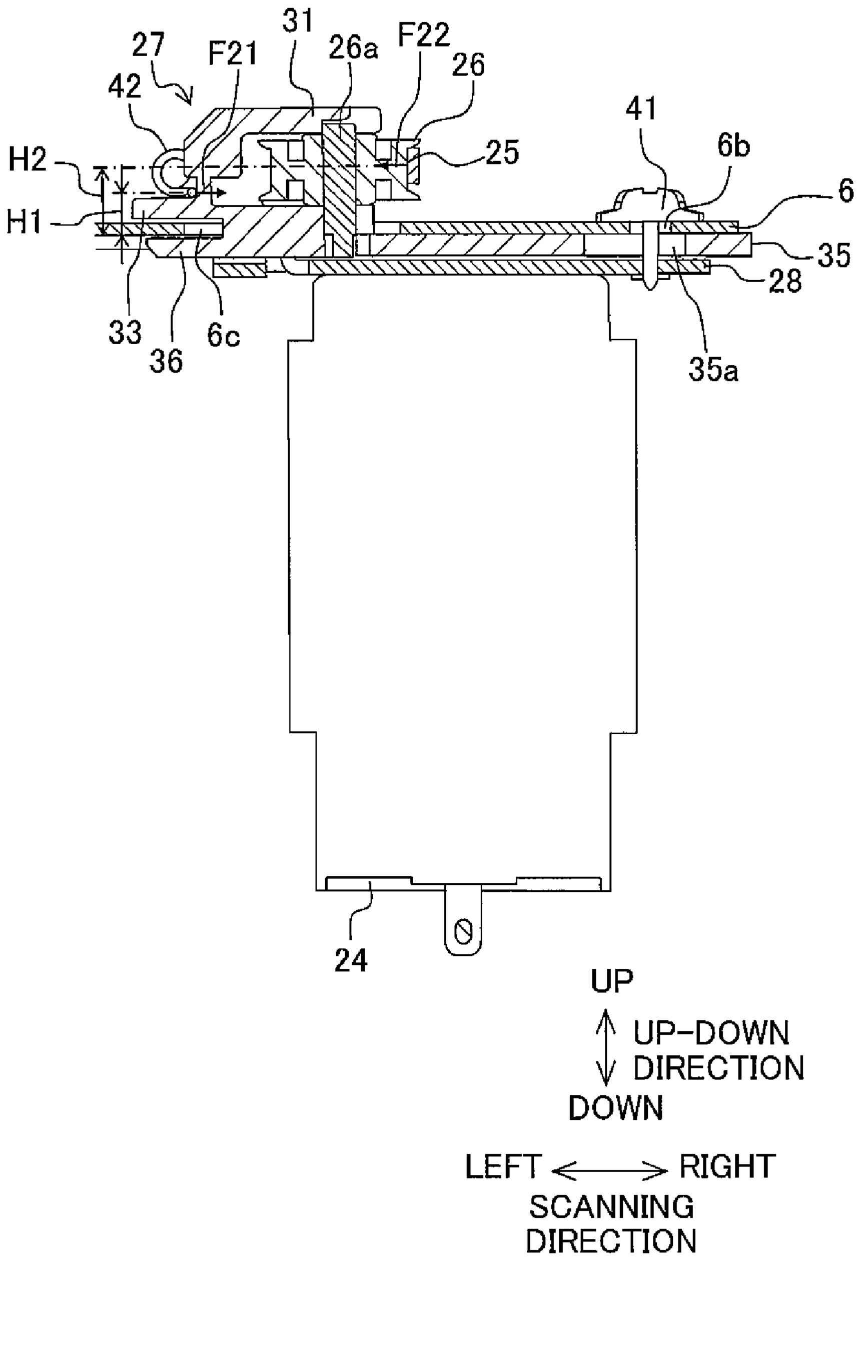
FIG. 6 is a cross-sectional view taken along a line VI-VI in FIG. 3.

Moreover, in the embodiment, as shown in FIG. 6, the force F21 directed rightward due to the torsion spring 42, in the scanning direction, and the force F22 directed leftward due to the tension in the belt 25, (in the scanning direction) act on the pulley holder 27. Moreover, as mentioned above, a portion of the pulley holder 27 on which the force F21 from the torsion spring 42 acts is positioned at a lower side of a portion of the pulley holder 27 on which the force F22 due to the tension in the belt 25 acts. Consequently, when a height of a position, from the lower surface of the guide rail 6 to which the pulley holder 27 is fixed, at which the force F21 acts and a height of a position at which the force F22 acts are is defined as H1 and H2 respectively (H2>H1), a moment Min a counterclockwise direction in FIG. 6, which is generated in the pulley holder 27 due to the two forces F21 and F22 is given by the following expression.

$$M=F22\cdot H2-F21\cdot H1 \qquad \text{[Expression 1]}$$

Here, at the time of assembling the pulley holder 27 and the torsion spring 42, since the force F21 and the force F22 are balanced, and F21=F22 (≅T), M becomes M>0. Therefore, the moment M acts on the pulley holder 27 so that an upper portion of the pulley holder 27 inclines toward left side.

Whereas, when the pulley 23 is rotated in the counterclockwise direction by driving the motor 24, firstly, the portion 25*b* of the belt 25 is pulled toward the pulley 23, and in conjunction with this, the portion 25*a* of the belt 25 is pulled toward the pulley 22. Moreover, accordingly, the carriage 2 moves to the left side.

At this time, since the portion 25*b* of the belt 25 is pulled, the tension in the portion 25*b* increases temporarily. In other words, the force F22 increases. Even in a case in which the force F22 has increased, there is no change in a relation M>0 in expression (1), and the direction in which the abovementioned moment M acts does not change. Consequently, at this time, it is possible to prevent the pulley holder 27 from shaking, and affecting the movement of the carriage 2.

When the pulley 23 is rotated in the clockwise direction by driving the motor 24, firstly, a portion 25*c* of the belt 25 between the pulley 21 and the pulley 23 is pulled toward the pulley 23 and in conjunction with this, the portion 25*a* of the belt 25 is pulled toward the pulley 21. Accordingly, the carriage 2 moves to the right side.

At this time, regarding the portion 25*b* of the belt 25, the portion 25*b* is slacked corresponding that the portion 25*c* is pulled, and the tension in the portion 25*b* (the force F22) decreases temporarily. In this case, as the force F22 decreases substantially, M becomes M<0 in expression (1), and the moment M acts in inclining the pulley holder 27 to come to a right side as much as a portion at the upper side, which is opposite of at the time of assembling. Therefore, in such a case in which M becomes M<0, sometimes, there is a shaking of the pulley holder 27, in a plane orthogonal to the paper feeding direction.

However, in this case, the carriage 2 moves when the carriage 2 is pulled by the portion 25*a* and the portion 25*c* of the belt 25. However, the portion 25*b* does not contribute to the movement of the carriage 2. Consequently, even when there is a shaking of the pulley holder 27, there is no effect on the movement of the carriage 2.

Moreover, unlike in the embodiment, assuming that the bias of the torsion spring 42 acts on a portion of the pulley holder 27 at the lower side of the guide rail 6. In this case, each of a moment which is generated in the pulley holder 27 due to the tension in the belt 25, and a moment which is generated in the pulley holder 27 due to the bias of the torsion spring 42 act so that the upper side of the pulley holder 27 is inclined leftward. Consequently, even when the tension in the belt increases or decreases temporarily, the direction of the abovementioned moment does not change, and there is no shaking of the pulley holder 27. However, in this case, since the two moments together act in the direction of inclining the pulley holder 27 to the left side, a large moment resulted by the two moments being added and combined is generated in the pulley holder 27. As a result, the first extended portion 33 and the second extended portion 35 which regulate the abovementioned inclination of the pulley holder 27 by making a contact with the guide rail 6 are pushed hard against the guide rail 6. In this case, at a point of time before fixing the pulley holder 27 to the guide rail 6 by the bolt 41, a large frictional force (twisting force) in the scanning direction acts between the pulley holder 27 and the guide rail 6. Therefore, there is a fear that the tension in the belt 25 is not enough to a tension corresponding to the bias of the torsion spring 42.

Whereas, in the embodiment, the force F21 due to the bias of the torsion spring 42 acts on the portion of the pulley holder 27, at the upper side of the guide rail 6. Therefore, the moment which is generated in the pulley holder 27 due to the force F22 by the tension in the belt 25 acts in the direction of inclining the pulley holder 27 so that the upper side of the pulley holder 27 is inclined rightward. Further, the moment which is generated in the pulley holder 27 due to the force F21 due to the bias of the torsion spring 42 acts in the direction of inclining the pulley holder 27 so that the upper side of the pulley holder 27 is inclined leftward. Consequently, the moment which is generated in the pulley holder 27 is a small moment which is resulted upon a part of the two abovementioned moments is counterbalanced (cancelled). Therefore, the pulley holder 27 is capable of moving freely with a small frictional force with respect to the guide rail 6. Therefore, it is possible to let the tension in the belt 25 immediately before tightening the bolt 41 assuredly to be a tension corresponding to the bias of the torsion spring 42.

The moment due to the forces F11, F12, and F13 acting in the paper feeding direction on the pulley holder 27 as mentioned above will be described below. The force F11 due to the tension in the belt 25 acts on the portion of the pulley holder 27, at the upper side of the guide rail 6, and the forces F12 and F13 acting from the shaft supporting portion 24*b* of the motor 24 and the edge surface of the through hole 6*c* act on the second extended portion 35 and the protrusion 34 positioned at the same height as of the guide rail 6. Therefore, each of the moment which is generated in the pulley holder 27 due to the force F11, F12, and F13 acts in the direction of inclining the pulley holder 27 so that the upper side of the pulley holder 27 inclines toward downstream side in the paper feeding direction. However, since the pulley holder 27 which is tilted by the moment has the arm 32 as mentioned above, it is possible to prevent from falling in the paper feeding direction by the arm 32 making a contact with the upper surface of the guide rail 6.

Next, modified embodiments in which various modifications are made in the embodiment will be described below. However, same reference numerals are assigned to components which are same as in the embodiment, and the description of such components will be omitted appropriately.

In the abovementioned embodiment, the encoder film 43 and the protective film 44 etc. have been arranged in the space S positioned at the downstream side of the portion 25*b*2 of the belt 25 in the paper feeding direction. However, without restricting to such an arrangement, components of the printer 1 other than the encoder film 43 and the protective film 44 may be arranged in the space S. For instance, a stopper which prevents a tube of ink supply from hanging down may be arranged, wherein the tube is used for supplying the ink toward the ink-jet head 3 from an ink tank (not shown). Or, a holding member which holds a part of the paper feeding roller may be provided.

Moreover, in the abovementioned embodiment, the pulley holder 27 is fixed to the lower surface of the guide rail 6. However, without restricting to such an arrangement, the pulley holder 27 may be fixed to the upper surface of the guide rail 6. Moreover, in this case, the moment M generated in the pulley holder 27 due to the forces F21 and F22, has each of the heights H1 and H2 in expression (1) reduced by the amount of thickness of the guide rail 6. Therefore, similarly as it has been mentioned above, at the time of assembling and the at the time of moving the carriage 2 to the left side, M becomes $M>0$. In this case, the upper surface of the guide rail 6 corresponds to a fixed surface according to the present teaching.

Moreover, in the abovementioned embodiment, the pulley holder 27 is fixed to the guide rail 6 by the bolt 41, and the bias of the torsion spring 42 acts on a portion of the pulley holder 27, at the upper side of the guide rail 6, and at the lower side of the portion on which the tension from the belt 25 acts. However, an arrangement is not restricted to such an arrangement.

For instance, the bias of the torsion spring 42 may act on a portion at the upper side (same side as of the belt 25, with respect to the fixed surface) of the guide rail 6, and positioned at a height same as of a portion on which the tension from the belt 25 acts. Alternatively, the bias of the torsion spring 42 may act on a portion at the upper side of the guide rail 6, and at an upper side of the portion on which the tension from the belt 25 acts. Alternatively, the bias of the torsion spring 42 may act on a portion of the pulley holder 27, at the lower side (side opposite to the belt 25, with respect to the fixed surface) of the guide rail 6.

Moreover, the pulley holder 27 may not be fixed to the guide rail 6. In this case, since the pulley holder 27 is movable in the scanning direction, as it has been mentioned above, when the force F22 has fluctuated, the pulley holder 27 moves in the scanning direction such that the force F21 and the force F22 are counterbalanced (cancelled).

Moreover, in the abovementioned embodiment, in the pulley holder 27, the protrusion 34 makes a contact with the wall surface 6*c*1 of the through hole 6*c* at the left side of the contact portion 25*b*1, and the edge surface 35*b* of the second extended portion 35 makes a contact with the shaft supporting portion 24*b* at the right side of the contact portion 25*b*1. Thereby, the pulley holder 27 is restricted from being moved to the downstream side in the paper feeding direction. However, the present teaching is not restricted to such an arrangement.

For instance, the movement of the pulley holder 27 to the downstream side in the paper feeding direction may be restricted by the edge surface 35*b* and the protrusion 34 of the pulley holder making a contact with a member other than the shaft supporting portion 24*b* of the motor 24 and the wall surface 6*c*1 of the through hole 6*c*. In this case, a member which makes a contact with the edge surface 35*b* and the protrusion 34 corresponds to a regulating mechanism according to the present teaching.

Moreover, the pulley holder 27 is not restricted to make a contact with the regulating mechanism at the portion on both right side and left side of the contact portion 25*b*1. For example, the movement of the pulley holder 27 may be regulated to move toward the downstream side in the paper feeding direction by the protrusion 34 positioned at the left side of the contact portion 25*b*1 only making a contact with the wall surface 6*c*1.

Moreover, in the abovementioned embodiment, the pulley holder 27 is movable in the scanning direction, and thereby the tension pulley 26 is movable in the scanning direction. Further the pulley holder 27 is biased by the torsion spring 42, and thereby the tension pulley 26 is biased. However, present teaching is not restricted to such an arrangement.

For instance, the tension pulley 26 may be fitted directly to the guide rail 6 to be movable in the scanning direction. Alternatively, the torsion spring 42 may apply bias to the tension pulley 26 directly.

Moreover, in the abovementioned embodiment, the pulley 23 is the driving pulley coupled with the shaft 24*a* of the motor 24. However, without restricting to such an arrangement, any one of the pulleys 21 and 22 may be the driving pulley.

Moreover, in the abovementioned embodiment, the torsion spring 42 applies bias to the pulley holder 27 in parallel to the scanning direction. However, without restricting to such an arrangement, the torsion spring 42 may apply bias to the pulley holder 27 in a direction inclined with respect to the scanning direction. However, in this case, the bias of the torsion spring 42 which is applied to the pulley holder 27 becomes substantial. Therefore, it is necessary to let the torsion spring 42 to be a spring having a large spring constant as compared to that in the abovementioned embodiment, and as a result, unevenness (variation) in the bias of the torsion spring 42 becomes somewhat large.

Moreover, in the abovementioned embodiment, the portion 25*b*2 of the belt 25, positioned between the contact portion 25*b*1 and the pulley 22 has been extended in parallel to the scanning direction. However, the portion 25*b*2 may be extended to be somewhat inclined with respect to the scanning direction. Even in this case, when the tension in the belt 25 is adjusted by moving the pulley holder 27 in the scanning direction, an angle made by the portion 25*b*2 with respect to the scanning direction almost does not change. Consequently, the size of the abovementioned space S is almost unchanged, and even when components of the printer 1 such as the encoder film 43 etc. are arranged in the space S, the portion 25*b*2 does not interfere with the component arranged in the space S when the tension in the belt 25 is adjusted.

In the abovementioned description, an example in which, the present teaching is applied to a printer which carries out printing by jetting an ink has been explained. However, without restricting to such an application, it is also possible to apply the present teaching to a liquid jetting apparatus other than printer, which jets a liquid other than ink.

What is claimed is:

1. A liquid jetting apparatus configured to jet a liquid, comprising: a casing;

a liquid jetting head configured to jet the liquid;

a carriage on which the liquid jetting head is mounted, and which is configured to be movable in a scanning direction;

a first pulley and a second pulley which are arranged in the casing, to be mutually isolated in the scanning direction such that an external common tangent of the first pulley and the second pulley is parallel to the scanning direction;

a third pulley which is arranged in the casing so that an external common tangent with the first pulley and the third pulley intersects with the scanning direction;

a motor which is coupled to one of the first pulley, the second pulley, and the third pulley;

an endless belt which is put around the first pulley, the second pulley, and the third pulley, to make a contact with the first pulley, the second pulley, and the third pulley, and on which the carriage is installed at a portion positioned on the external common tangent of the first pulley and the second pulley;

a tension pulley which makes a contact with a contact portion of the endless belt, which is positioned on a surface on an outer side of a portion of the endless belt between the second pulley and the third pulley, and which is movable in the scanning direction to adjust a tension to the endless belt by bending the portion of the endless belt between the second pulley and the third pulley;

a regulating mechanism which is configured to regulate a movement of the tension pulley within a plane orthogonal to a shaft of the tension pulley such that the tension pulley is movable in the scanning direction; and a bias applying mechanism which is configured to apply bias to the tension pulley, in a direction of moving closer to the third pulley in the scanning direction.

2. The liquid jetting apparatus according to claim 1, wherein the bias applying mechanism applies bias parallel to the scanning direction, to the tension pulley.

3. The liquid jetting apparatus according to claim 1, wherein the motor is coupled to the third pulley.

4. The liquid jetting apparatus according to claim 1, further comprising:

a pulley holder which is configured to hold the tension pulley, wherein the regulating mechanism regulates the movement of the tension pulley by regulating a movement of the pulley holder, and the bias applying mechanism applies bias to the tension pulley by applying bias to the pulley holder.

5. The liquid jetting apparatus according to claim 4, wherein the pulley holder is arranged to extend in both sides of the contact portion of the tension pulley in the scanning direction, the contacting portion contacting with the endless belt, and the regulating mechanism makes a contact with a portion of the pulley holder is positioned on one side of the contact portion in the scanning direction and with a portion of the pulley holder positioned on an opposite side of the one side of the contact portion in the scanning direction, such that the regulating mechanism regulates the movement of the pulley holder.

6. The liquid jetting apparatus according to claim 4, further comprising: a fixing mechanism which fixes a position of the pulley holder on which the bias is applied by the bias applying mechanism.

7. The liquid jetting apparatus according to claim 6, wherein the fixing mechanism fixes the pulley holder to a fixing surface which intersects the shaft of the tension pulley, and the bias applying mechanism applies bias to a portion of the pulley holder, which is on a same side as the endless belt with respect to the fixing surface, and which is closer to the fixing surface than a contact portion of the tension pulley with the endless belt.

8. The liquid jetting apparatus according to claim 1, further comprising: an encoder film which is extended in the scanning direction, and which is arranged between a portion of the endless belt between the second pulley and the contact portion, and a plane parallel to the scanning direction passed the shaft of the third pulley; and an encoder which includes a position detecting mechanism which detects a position of the carriage by using the encoder film.

9. The liquid jetting apparatus according to claim 1, wherein the first and second pulleys and the tension pulley are arranged such that a portion of the endless belt between the first pulley and the second pulley is parallel to a portion between the endless belt between the tension pulley and the second pulley.

10. The liquid jetting apparatus according to claim 1, wherein the endless belt has a plurality of teeth on a surface thereof contacting the first to third pulleys, and the one of the first, second and third pulleys coupled to the motor has a plurality of teeth engaging with the plurality of teeth of the endless belt.

11. The liquid jetting apparatus according to claim 9, wherein the carriage is fixed on the portion of the endless belt between the first pulley and the second pulley, such that the carriage is movable along with the endless belt.

12. The liquid jetting apparatus according to claim 4, wherein the casing includes a guide rail which extends in the scanning direction to guide the carriage along the guide rail and in which a through hole is formed, the pulley holder includes extending portions which extend in the scanning direction above and below the guide rail, respectively, and a connecting portion which connects the extending portions through the through hole, and on which a protrusion protruding toward an inner surface of the through hole is formed, and the protrusion comes into contact with the inner surface of the through hole of the guide rail, and a side surface of one of the extending portions comes into contact with a shaft of the motor.

13. The liquid jetting apparatus according to claim 6, wherein the fixing mechanism is arranged at an outer side of the tension pulley in the scanning direction.

14. The liquid jetting apparatus according to claim 13, wherein the bias applying mechanism, the tension pulley and the fixing mechanism are aligned in this order from inner side toward outer side in the scanning direction.

* * * * *